Feb. 17, 1942.  M. H. SCHROEDER  2,273,422
BEVERAGE FILTER
Filed June 28, 1940

Inventor
Max H. Schroeder
By Stevens and Davis
Attorney.

Patented Feb. 17, 1942

2,273,422

UNITED STATES PATENT OFFICE 2,273,422

BEVERAGE FILTER

Max H. Schroeder, Rockville Centre, N. Y.

Application June 28, 1940, Serial No. 343,043

5 Claims. (Cl. 210—160)

This invention relates to the preparation of beverage extracts and more particularly to a device for expediting the preparation of coffee or tea.

According to known processes for the preparation of coffee or tea, either an infusion or a decoction is produced by suitable treatment of the solute containing starting material.

In preparing infusions the starting material is either steeped in hot water or hot water is poured thereover and will, in passing, absorb those soluble constituents which impart the characteristic flavor to the beverage. A decoction, on the other hand, involves boiling the solvent and starting material in admixture to produce the beverage extract. In either case, several essentials are necessary to insure the production of an appealing, well flavored extract beverage. For example, sufficient time of contact must be allowed to insure that the soluble, flavor imparting constituents are properly dissolved in suitable concentration while the presence of material in suspension in the final product must be avoided to render the beverage extract clear and appetizing.

In the large scale preparation of infusion beverages including the employment of equipment which is expensive as regards initial cost and difficult to maintain as regards high standards of cleanliness and sterilization, efforts to attain the criteria set forth above have met with some measure of success. On the other hand, the difficulties encountered in the production of decocted beverages of acceptable clarity have been so great as to very largely eliminate the use of this type of beverage in restaurants and other commercial eating places.

Coffee prepared according to the steeping or percolator method usually suffers from the same deficiencies as that prepared by decoction, that is, material in suspension renders the beverage cloudy and objectionable in both appearance and taste. Drip coffee is usually of satisfactory clarity, but unless made in large quantities the path of contact between coffee and hot water is insufficient to produce a solution of sufficient concentration. If powdered coffee is used to avoid this difficulty, insoluble material is entrained and the deleterious effect thereof is imparted to the final product.

It is therefore an object of this invention to overcome all of the foregoing difficulties and to render convenient and feasible the production of either infusion or decoction beverages of any desired concentration of solute, while the presence of objectionable material in suspension in the final product is entirely avoided.

By the employment of this invention, small quantities of either infusion or decoction beverages, of high quality as regards concentration of solute and clarity of final product, may be prepared without reliance upon expensive equipment which is difficult to clean and maintain. According to this invention, beverage extracts may be prepared without the use of any permanent equipment save a receptacle for the preparation of hot water, the device of the present invention being economical in use, sanitary, convenient and wholly disposable after the preparation of the beverage is complete. Washing and sterilization of equipment are thus completely avoided, while beverages of great clarity are producible from the very finest grinds of coffee or the like.

Other objects and advantages of this invention will appear from a consideration of the following detailed description thereof in conjunction with the annexed drawing wherein.

Figure 1:
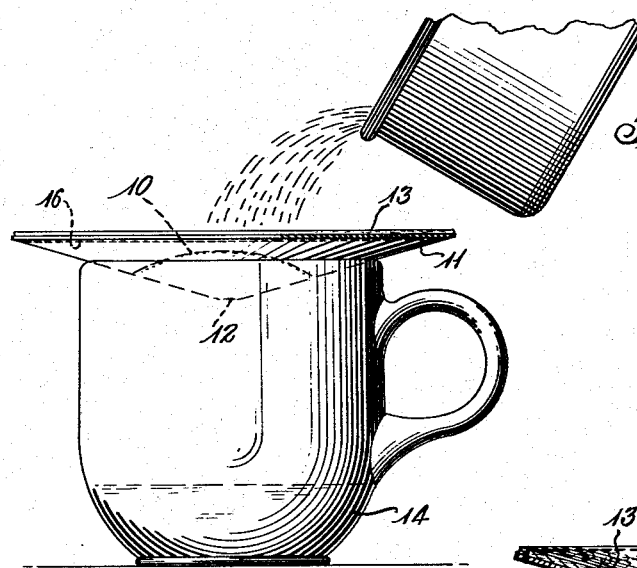
Figure 1 is a view in elevation of a preferred form of the invention adapted for use in preparing a single cup of a beverage infusion.

Referring particularly to Figure 1, it will be noted that a beverage infusion is prepared by pouring hot water through a starting material such as powdered coffee 10. This coffee is held within a generally conical receptacle 11 having a drain opening 12 at the apex thereof. Receptacle 11 is lined with a filtering material 13 which extends across the opening at 12. The hot water contacts the powdered coffee and the soluble constituents thereof are absorbed and drain through filter lining 13 into cup 14. Any material tending to go into suspension is held within receptacle 11 by filter lining 13.

Receptacle 11 is made of paper such as a suitable card stock and is of sufficient rigidity to keep its shape when filled with coffee as shown in Figure 1. The material selected must, of course, be heavy enough to withstand at least temporary exposure to hot water. Suitable waterproofing material may be applied to the card stock either before or after assembly of the receptacle. It will be seen that the rigidity of receptacle 11 is an important phase of the invention since in preparing coffee in small amounts it is a matter of no small convenience to support the receptacle on the rim of the cup.

Figure 2:
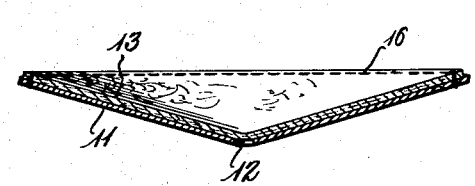
Figure 2 is a view in section of a filtering element made according to this invention.
Figure 3:
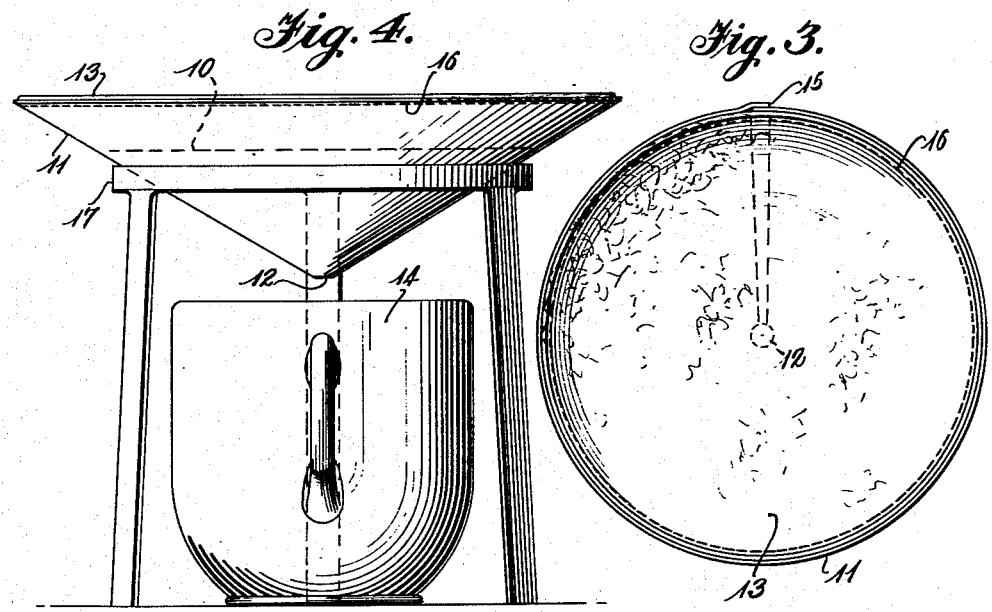
Figure 3 is a top plan view of the filtering element of Figure 2.

The details of the receptacle and its lining of filtering material may be appreciated by reference to Figures 2 and 3. The receptacle itself is formed from a blank and has a single overlapping seam fastened as indicated at 15. A disc of cotton wool is deformed to conform to the interior of receptacle 11. The disc may be stitched to the receptacle as shown at 16 or may be caused to adhere thereto by the employment of a tasteless glue applied around the margins thereof. In many instances it is not necessary to fasten the disc to the receptacle at all, although the use of fastening means obviates the possibility of the receptacle and disc becoming separated during transportation.

Filter paper, cloth or other filtering material may be substituted in lieu of cotton wool lining 13 although the latter has proved the most satisfactory under most conditions. Cotton wool may be inserted in receptacle 11 in the form of a double as well as a single disc.

Figure 4:
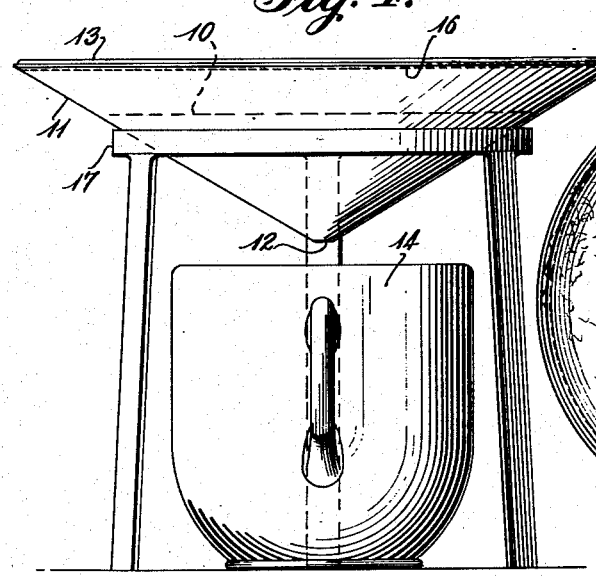
Figure 4 is a view in elevation of a modified form of the invention adapted for the preparation of larger quantities of beverage extracts including a support for the filtering element.

In some instances it may be desirable to employ, in making receptacle 11, a relatively light paper which, although less expensive, is generally less resistant to deformation when subjected to the weight of the material from which the beverage is made. In this case a rack 17, shown in Figure 4, may be used to support the cone midway of its length. The receptacle is otherwise as shown in Figures 1, 2 and 3.

It has been found convenient to prepare the receptacles in two sizes, a large size adaptable for the preparation of one to four cups of coffee or tea and a small size adaptable for making one to two cups thereof. In any case, the apex angle of the receptacle should be in excess of 90° so that a suitable amount of coffee can be supported over a cup while the apex of the receptacle will be above the liquid level when the cup is full.

If, instead of the preparation of an infusion as illustrated in Figure 1, a decocted beverage is prepared, the starting material is boiled with the water until a solution of the desired concentration is produced. Thereafter, the boiled mixture is poured into receptacle 11 where it is filtered. The filtered solution is clear and entirely palatable, Whether the extract beverage is prepared as an infusion or as a decoction the receptacle 11 and filter 13 are disposable immediately upon completion of the preparation of the beverage. Washing and other maintenance are thereby avoided. On the other hand, because of the fact that a new filter lined receptacle is used each time a new batch of beverage is prepared, cleanliness is an inherent feature of this invention.

Although the invention has been described in conjunction with the preparation of tea and coffee it is apparent that it is capable of wide use in the preparation of all types of liquid material, the invention being limited only by the scope of the appended claims.

What is claimed is:

1. A device for use in the preparation of beverage extracts comprising, a rigid self-supporting paper receptacle in the form of an inverted cone having a drain aperture at the apex thereof, and a lining of imperforate filtering material within said receptacle and sewed thereto.

2. A device for use in the preparation of beverage extracts comprising, a rigid, impervious, self-supporting, disposable receptacle substantially in the form of an inverted cone having a drain aperture only at the apex thereof, a lining of imperforate filtering material covering substantially all of the interior of said receptacle and extending across said drain aperture, and means permanently connecting said receptacle and lining for unitary use and disposal, said lining being characterized by lack of rigidity when wet.

3. A device according to claim 2 in which the means permanently connecting the receptacle and lining is glue.

4. A device according to claim 2 in which the receptacle is of paper while the filter material is a disc of cotton wool deformed to conform to the inner surface of the cone.

5. A device according to claim 2 in which the apex angle of the conical receptacle is in excess of 90°.

MAX H. SCHROEDER.